Patented May 8, 1951

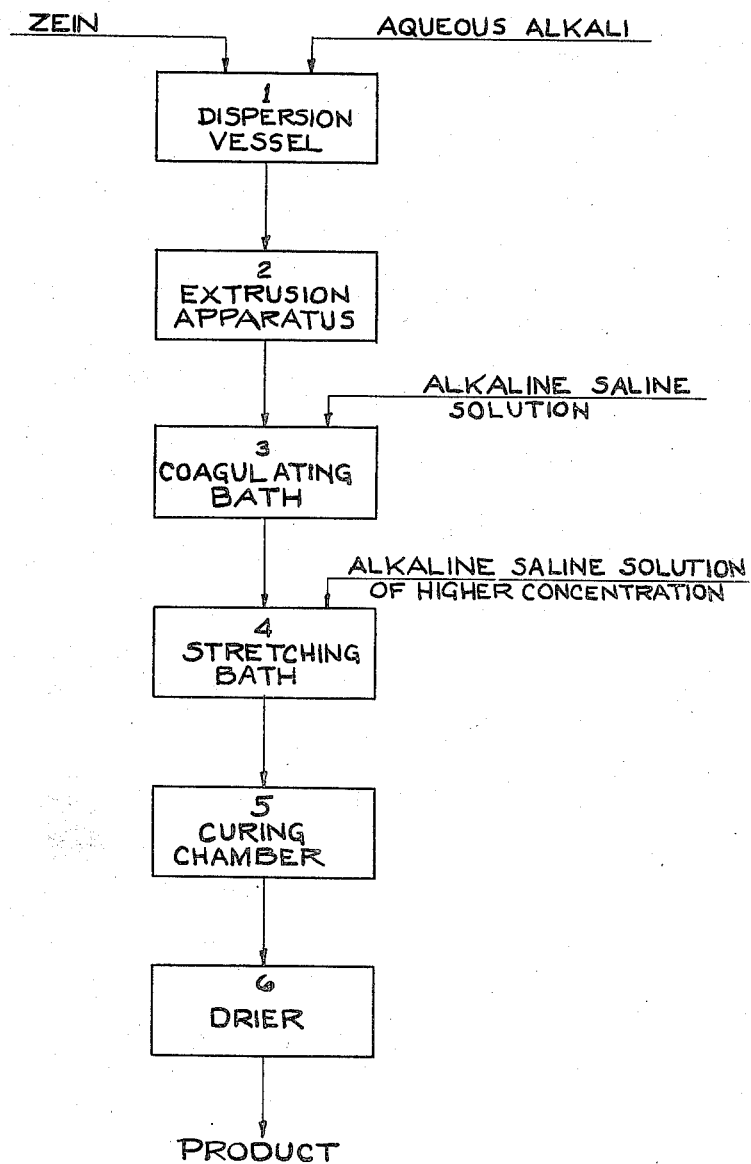

2,552,079

UNITED STATES PATENT OFFICE 2,552,079

PRODUCTION OF ZEIN FIBERS

William E. C. Yelland, Washington, D. C., and Carl C. Jensen, Oak Park, Ill., assignors to Corn Products Refining Company, New York, N. Y., a corporation of New Jersey Application September 21, 1948, Serial No. 50,438

12 Claims. (Cl. 18—54)

This invention relates, generally, to improvements in artificial filaments, threads and films, formed from zein, and to improvements in methods of making the same.

It has been previously proposed to make filaments from zein by a process which involves:

(1) Preparing an alkali dispersion or solution of zein;

(2) Extruding such solution or dispersion into an acidic coagulating bath;

(3) Precuring the coagulated product in a mild formaldehyde precuring bath, and (4) Stretching the precured product.

This prior process has a number of objectionable features. One objectionable feature is that of the necessity of precuring the coagulated product prior to stretching. Another objectionable feature involves the insolubility of the coloring material present in commercial zein in the coagulating bath causing it to be precipitated in the extruded product so as to impart an undesirable dark color thereto. Still another objectionable feature results from the appreciable acid content of the coagulating bath making it difficult to handle because of its corrosive action and danger to operating personnel.

Another proposed process for making filaments from zein, involves extruding an alcoholic solution thereof into a coagulating bath comprising 5% sodium chloride.

This process appears not to have met with success and one serious disadvantage thereof is the slow rate of coagulation of the aqueous alcoholic zein spinning dope.

The object of the present invention, generally stated, is the provision of a new and improved process of making extruded products from aqueous alkali dispersions or solutions of zein, which process affords products having materially improved properties.

An important object of the invention is the elimination of the use of an acidic coagulating bath in the production of extruded products from zein by the wet-spinning process.

An important object of the invention is the elimination of a precuring step in the production of extruded products from zein by the wet-spinning process.

Still another important object of the invention is provision of a process of making artificial filaments, threads and films from zein wherein an aqueous alkali dispersion or solution of zein is coagulated in an aqueous alkaline saline coagulating bath and then without precuring, is oriented and stretched in a more concentrated aqueous alkaline saline bath.

Certain other objects of the invention will in part be obvious, and will in part appear hereinafter.

Reference may now be had to the following detailed description of the invention in connection with the accompanying drawing and certain presently preferred embodiments thereof.

The drawing is a flow chart representing the main steps of the improved process provided by the present invention.

A dope for extrusion is prepared in dispersion vessel 1 by dissolving or dispersing the zein in aqueous alkali. This zein solution or dispersion is extruded through any suitable apparatus 2 to impart the desired shape. The extruded product is collected in an aqueous alkaline saline coagulating bath 3, and the coagulated product stretched and oriented in an aqueous alkaline saline bath 4, which has a higher concentration of electrolyte than the coagulating bath 3. The stretched and oriented product is then cured at 5 and dried at 6 in accordance with known techniques.

The improvements and novel features of the present invention are particularly directed to steps 3 and 4 above.

The example below constitutes a detailed description of the presently preferred process of making zein fibers in accordance with the invention.

*Example*

112.5 parts of commercial zein are suspended in 675 parts of water at 0–5° C., and allowed to stand in the cold with occasional shaking for fifteen minutes. To this suspension are then added with vigorous agitation 75 parts of cold 1.1 normal sodium hydroxide. This produces a solution or dispersion approximately 0.11 normal in alkali. The mixture is allowed to stand at 0–5° C. for one hour with intermittent shaking. Then it is allowed to warm to room temperature. The zein dissolves slowly producing a dark amber colored solution free of lumps and having a viscosity such that it can be extruded by a pressure of 50–150 pounds per square inch through conventional and known viscose wet-spinning equipment consisting of a viscose-metering pump, candle filter, goose neck and spinneret. The solution is freed of dirt and air bubbles either by filtration through an appropriate pressure filter or by centrifugation. It is then allowed to age at least 16–18 hours whereupon it is ready for use.

The thus prepared solution of zein in dilute aqueous alkali has approximately the following composition:

| | Per cent by weight |
|---|---|
| Zein | 13.03 |
| Sodium hydroxide | 0.33 |
| Water | 86.59 |

If desired, small amounts of adjunct materials may be added to the spinning dope for the purpose of improving the fibers, so long as such adjunct materials are compatible with the zein. For example, the spinning dope may contain in minor amounts the sodium salts of the hydroxides of amphoteric metals (i. e. aluminum, trivalent chromium, etc.) or urea, or formaldehyde, or various resins.

The spinning dope, prepared as above, is extruded into a coagulating or spinning bath formed by an aqueous solution of sodium carbonate in approximately 0.33 molal concentration, i. e. 0.33 mole sodium carbonate in 1000 grams of water. This is equivalent to 3.4 parts of anhydrous sodium carbonate per 100 parts of solution. The spinning dope is forced through a conventional viscose spinneret which is supported from one to two inches below the surface of the coagulating bath. The spinneret may have the usual 40, 60, 100 or more holes therein. As the filaments emerge from the spinneret they are gathered into a tow drawn through the bath and removed from it by a roll or drum which transfers them to the orienting and stretching bath described below. The ionic strength of the coagulating bath is approximately 1.0. The coagulating bath has a temperature of approximately 21° C.

Ionic strength, $\mu$, is defined by:

$$\mu = \frac{C_1 V_1^2 + C_2 V_2^2 + C_3 V_3^2 + \cdots}{2}$$

where $C_1$, $C_2$, $C_3$ are the various ion concentrations and $V_1$, $V_2$, $V_3$ are the various ion valencies. For 0.33 molal sodium carbonate $$\mu = \frac{0.66(1)^2 + 0.33(2)^2}{2} = 0.99 = 1 \text{ approx.}$$

The pH value of the coagulating bath may be maintained by addition of carbon dioxide or sodium bicarbonate. Because of the fact that the zein fibers, as they leave the coagulating bath, will entrain appreciable amounts of liquid from the bath, it will be necessary to add fresh solution to it, of such concentration that the volume of the coagulating bath and also its ionic strength remain substantially constant.

The orienting or stretching bath is more concentrated than the coagulating or spinning bath. An aqueous solution having approximately 1.8 molal concentration of sodium carbonate (i. e. approximately 2 moles of sodium carbonate per 1000 grams of water) was used in this example. Such a solution contains approximately 16–17% by weight anhydrous sodium carbonate, and has an ionic strength of approximately 5 to 6. The dilute sodium carbonate solution of the coagulating bath will be entrained by the fibers as they pass into the more concentrated carbonate solution of the stretching bath, and will gradually dilute it. Therefore, provision must be made for maintaining a sufficiently high ionic strength in the stretching bath, e. g. by addition of dry sodium carbonate or recycling the bath through a concentration step to remove water. The bath had a temperature of approximately 50° C. The extruded and coagulated filaments were stretched in the orientation or stretching bath by means of a roll or drum which removes the fiber from the stretching bath at a higher speed than the corresponding roll or drum which feeds the fiber into the bath. The fibers were stretched at least 200–300% of their length in the bath.

The stretched and oriented fibers are next cured, thereby rendering the structure tougher and more water-resistant in accordance with one of the known techniques for curing protein fibers. Thus, the stretched and oriented zein fibers may be cured with formaldehyde at a low pH value in the presence of ammonium chloride or a similar catalyst. Other treatments such as acetylation may be used to enhance the water resistance of the fiber. However, as indicated above, the curing step may proceed in accordance with other known conventional techniques for curing.

Although an exact and complete explanation of the improved qualities and characteristics of zein fibers made in accordance with the present invention is not fully available at this time, it appears that to a large extent such improved qualities and characteristics stem from a highly oriented molecular structure. Thus, it is well known that fibers, both natural and artificial, having a well oriented molecular structure have considerably higher dry and wet strengths than those fibers in which the molecules have a more random arrangement. It is also well known that, in general, stretching of artificial fibers after spinning leads to orientation of the molecules in a direction parallel to the fiber axis and produce a marked improvement in the tensile properties of the fiber. This stretching technique has previously been utilized in the production of high tenacity viscose rayons and nylons, as well as protein fibers.

It is thought that when zein is dissolved in aqueous alkali (in contra-distinction to aqueous-organic solvent systems) its molecules are unfolded (denatured) and pass into a more nearly fibrous shape, suitable for stretching and orientation. However, when the extruded aqueous alkali solution of zein is precipitated in acidic salt solutions in accordance with the prior art practice, these unfolded zein molecules tend to revert to their previous folded state, form weak fibers and, for this reason require some treatment, such as precuring, before the molecules can be effectively oriented by stretching. On the other hand, when the extruded zein fibers are precipitated or coagulated into an alkaline saline bath in accordance with the present invention, it appears that the molecules retain their unfolded shape and form stronger fibers. Consequently, they may be readily parallelized or oriented by stretching the filaments without further pretreatment. Also, because of the highly extended shape of the individual molecules, higher degrees of orientation may be obtained by the same amount of stretching than is possible with fibers containing zein molecules which are not unfolded. This higher degree of orientation will result in considerably improved fiber properties, tensile strength, water resistance, etc.

Experimental studies and development work have shown that a number of modifications may be made in the preferred embodiment of the invention outlined above in connection with the example. These permissible modifications will, for convenience, be discussed in the order in which they occur in the process, commencing with the preparation of the spinning dope.

The primary requirement of a suitable zein spinning dope in the form of a solution or dispersion of zein in aqueous alkali, for use in accordance with the process of this invention, is that such a spinning dope be capable of extrusion in conventional wet-spinning equipment under normal operating conditions. Considering more specific qualifications, the zein used for preparation of the spinning dope may be either commercial zein or the known modified zeins or zein derivatives. The concentration of the zein in the spinning dope may range from 10–20% by weight. A concentration less than 10% by weight is not recommended, unless the viscosity of the solution is increased by some treatment, since the zein coagulated from such a low viscosity solution tends to cling to the base of the spinneret in the form of "worms" or "bubbles." On the other hand, concentrations of zein greater than 20% by weight are not recommended unless precautions are taken to prevent the zein from gelling in the equipment prior to extrusion. The preferred concentration for ordinary normal operation is approximately 13% by weight.

The alkali concentration in the spinning dope may vary somewhat from that of 0.11 normally set forth in the example. However, the concentration must not be so low as to permit the zein to separate out of the dispersion, nor must the concentration be so high as to cause hydrolysis of the protein. In place of sodium hydroxide, the other alkali metal hydroxides (i. e. lithium or potassium) may be used. If desired, mixtures of these hydroxides may also be used. For commercial purposes, sodium hydroxide is the alkali of choice.

The zein spinning dope may be aged for various periods of time, at different temperatures, as known to those skilled in the art, in order to obtain viscosities satisfactory for extrusion.

Turning to the consideration of the spinning or coagulating bath, this is broadly characterized as alkaline saline coagulating bath. Preferably, it is made up with sodium carbonate. The preferred concentration of the sodium carbonate is approximately 0.33 mole per 1000 grams of water, although a concentration as low as 0.2 molal and as high as 1.8 molal can be employed. The optimum range of ionic strength for the coagulating bath is from 0.75 to 1.5 and the concentration should be adjusted within this range. When coagulating baths of lesser ionic strengths are used, the filaments tend to be too weak to be readily handled, whereas, when baths with ionic strength above this range are used, the filaments tend to be less extensible.

The sodium carbonate may be replaced with certain other salts or with mixtures of certain salts. Thus, lithium and potassium carbonates may be substituted for sodium carbonate, in comparable strengths. The tertiary phosphates of the alkaline metals may be used. The chlorides and sulphates of the alkaline metals may be used provided that the pH of the coagulating bath is adjusted to a value of approximately 11 by the addition of an alkali metal hydroxide or carbonate. In all cases, the pH value of the bath should be within the range of 10.5–11.5.

In addition to the above inorganic salts, other inorganic salts and also oxidizing and reducing agents which are soluble at high pH values and which are compatible with the carbonates of the alkali metals, may be added in very small amounts for certain specific purposes. Thus oxidizing agents, e. g. ferricyanides, chromates, and peroxides lessen sticking together of the fibers, but also lessen wet extensibility. However, hypochlorite, as used, attacked the fibers. Reducing agents, e. g. monothioglycol, cyanides, ferrocyanides, and sulfides give greater wet extensibility, but sticking is pronounced and the fibers seem weak. It has been found advisable to avoid the presence of acetates, and ammonium salts, since inferior fibers appear to be produced in the presence of these compounds.

Certain organic bases, such as guanidine carbonate, may be used as the salt constituent of the coagulating bath. However, tetra alkyl ammonium hydroxides have not been found to be satisfactory as a class.

Materials such as sucrose, sorbitol, etc., may be added to the bath for the purpose of preventing the filaments from sticking together. In general, it is preferred not to use such materials, as it is possible to prevent sticking by maintaining the proper concentration of the carbonate or other salt to keep the ionic strength of the solution close to unit, or at least between the values of 0.75 and 1.50.

Bath temperatures close to room temperature (e. g. 21° C. approximately) are satisfactory. Higher temperatures may be used if precautions are taken to prevent the filaments from sticking together. Lower temperatures may be used if a slower spinning rate is used.

The rate of extrusion, and the length of traverse of the extruded fiber in the spinning bath, depend for the most part on the particular mechanical equipment in use. In general, any of the procedures used in wet-spinning viscose yarn are suitable.

The orientation or stretching baths may be characterized as corresponding qualtitatively to the coagulating or spinning baths, but as having increased concentrations. Again, sodium carbonate is the alkaline salt of choice for preparation of these baths. The stretching baths should have a pH value of approximately 11 and may have alkaline metal carbonate concentrations corresponding to ionic strength values of 5.4 up to those corresponding to saturation. At the higher concentrations, the stretching baths should be heated to above room temperature. In general, it is preferable to work just below the saturation value at any particular temperature in order to avoid crystallization of the salt from the bath.

The orienting or stretching baths may range in temperature from room temperature up to approximately 90° C. It is preferable to work at approximately 50° C., since this temperature is just above the gum point of zein. The gum point of zein is that temperature at which zein forms a gummy ball upon being heated in water. Temperatures above 50° C. may tend to make the fibers too soft to handle conveniently. Temperatures below 50° C. make the filaments slightly less readily stretched. At the higher temperatures, the concentration of the sodium carbonate should be increased to just below the saturation value for the particular temperature.

The sodium carbonate in the stretching or orientation baths may be replaced with other ingredients and mixtures of ingredients as discussed above in connection with the coagulating or spinning baths. However, the salts used in the stretching bath, if different from those in the spinning bath, must be compatible with them, i. e. the salts in the coagulating bath must not form precipitates or react in any way with those in the coagulating bath. Otherwise difficulty will be encountered in the stretching bath by solution entrained from the coagulating bath by the filaments. Preferably, in a given process, the coagulating baths and the stretching bath should have the same qualitative composition, although it is possible to have different compositions. The pH values of the stretching bath and of the coagulating bath should be approximately the same in any particular process.

In relation to the coagulating baths, the stretching or orientation baths may be characterized as of being of considerably higher concentration and as operating at higher temperatures than the coagulating baths.

The fibers may be stretched in the stretching baths through the known available equipment for this purpose. At a bath temperature of approximately 50° C., the fibers have been stretched at least 200–300% of their length. Higher percentages of stretch are readily obtained at slightly higher temperatures.

As indicated above under the example, the curing operation or step is more or less conventional and by itself does not constitute a novel feature of the present invention. However, it should be noted that if curing is done in an acid bath, there will be some tendency for the filaments to contract during this phase of the operation. Accordingly, in such instances, it will be necessary to take this contraction into consideration and adjust the relative speeds of the rolls or drums which feed the fiber into the bath and remove it therefrom, so as to avoid too much tension on the fiber during curing.

Although the invention has been specifically described in connection with the production of filaments or threads, it will be understood that sheets or films may be formed in accordance with the same procedures.

Commercial zein contains varying amounts of yellowish coloring material which is insoluble in acid but soluble in alkaline solutions. In the process of the present invention, because of the alkalinity of the coagulating baths, this objectionable coloring material dissolves and remains in the baths with the result that a lighter colored filament is obtained than in the process of the prior art wherein an acid coagulating bath is used which results in the precipitation of the coloring material in the fiber itself.

Having fully described the invention and set forth the best method of practicing the same, and indicated a number of permissible variations and other embodiments of the invention, what is claimed as new is:

1. A process for producing artificial filaments, threads, and films from zein, which comprises preparing an aqueous dispersion of zein suitable for extrusion, extruding said dispersion through an orifice to impart the desired shape, collecting the extruded product in an aqueous saline coagulating bath having an ionic strength equivalent to that within the range of about 0.2 molal to 1.8 molal sodium carbonate and having a pH value within the range of about 10.5 to 11.5, thereafter stretching and orienting the coagulated product in an aqueous saline bath having an ionic strength exceeding that of said coagulating bath, curing and drying said oriented and stretched product.

2. The process of claim 1 wherein said coagulating bath consists essentially of an aqueous solution of an alkali metal carbonate.

3. The process of claim 1 wherein said coagulating bath consists essentially of an aqueous solution of an alkali metal tertiary phosphate.

4. The process of claim 1 wherein said coagulating bath consists essentially of an aqueous solution of at least one alkali metal salt of the group consisting of the chlorides and sulfates, with sufficient amount of at least one substance from the group consisting of alkali metal hydroxides and carbonates present to give the solution a pH value of approximately 11.

5. The process of claim 1 wherein said coagulating bath consists essentially of an aqueous solution of guanidine carbonate.

6. The process of claim 1 wherein said stretching and orienting bath has an ionic strength of at least approximately 5.

7. The process of claim 1 wherein said stretching and orienting bath has substantially the same qualitative composition as said coagulating bath.

8. The method of claim 1 wherein said extruded and coagulated product is stretched at least 200% of its length during said orientation and stretching.

9. A process for producing artificial filaments, threads and films from zein, which comprises, preparing an aqueous alkali solution of zein containing approximately 13% by weight of zein and approximately 0.38% by weight of sodium hydroxide, extruding said dispersion through an orifice to impart the desired shape, collecting said extruded product in an aqueous alkaline saline coagulating bath wherein the electrolyte content consists essentially of sodium carbonate in approximately 0.33 molal concentration, having a temperature of approximately 21° C., thereafter stretching and orienting the coagulated product in an aqueous alkaline saline bath wherein the electrolyte content consists essentially of sodium carbonate in approximately 1.8 molal concentration, said stretching amounting to at least approximately 200% of the length of the coagulated product, curing and drying said stretched and oriented product.

10. A process for producing artificial filaments, threads, and films from zein, which comprises, preparing an aqueous alkali dispersion of zein suitable for extrusion, extruding said dispersion through an orifice to impart the desired shape, collecting the extruded product in an aqueous alkaline saline coagulating bath having an ionic strength of approximately 0.75 to 1.5 and a pH value of approximately 10.5 to 11.5, thereafter stretching and orienting the coagulated product in an aqueous alkaline saline bath having an ionic strength exceeding that of said coagulating bath, curing and drying said oriented and stretched product.

11. A process for producing artificial filaments, threads, and films from zein, which comprises, preparing an aqueous alkali dispersion of zein suitable for extrusion, extruding said dispersion through an orifice to impart the desired shape, collecting the extruded product in an aqueous alkaline saline coagulating bath wherein the electrolyte content consists essentially of an aqueous solution of sodium carbonate having an ionic strength of approximately 0.75 to 1.5 and a pH value of approximately 10.5 to 11.5, thereafter stretching and orienting the coagulated product in an aqueous alkaline saline bath having an ionic strength exceeding that of said coagulating bath, curing and drying said oriented and stretched product.

12. A process for producing artificial filaments, threads, and films from zein, which comprises, preparing an aqueous alkali dispersion of zein suitable for extrusion, extruding said dispersion through an orifice to impart the desired shape, collecting said extruded product in an aqueous alkaline saline coagulating bath wherein the electrolyte content consists essentially of an aqueous solution of sodium carbonate having an ionic strength of approximately 0.75 to 1.5 and a pH value of approximately 10.5 to 11.5, thereafter stretching and orienting the coagulated product in an aqueous alkaline saline bath wherein the electrolyte content consists essentially of an aqueous solution of sodium carbonate having an ionic strength of approximately 5 up to that corresponding to maximum solubility of the carbonate at the bath temperature employed, curing and drying said oriented and stretched product.

WILLIAM E. C. YELLAND.
CARL C. JENSEN.

REFERENCES CITED

The following references are of record in the file of this patent:

FOREIGN PATENTS

| Number | Country | Date |
|--------|---------|------|
| 537,740 | Great Britain | July 4, 1941 |